United States Patent
Winkler

(10) Patent No.: US 12,149,556 B2
(45) Date of Patent: Nov. 19, 2024

(54) METHOD FOR ASSESSING INDIVIDUAL VULNERABILITY TO PREDATORY INTERNET ATTACKS

(71) Applicant: Ira Winkler, Davidsonville, MD (US)

(72) Inventor: Ira Winkler, Davidsonville, MD (US)

(*) Notice: Subject to any disclaimer, the term of this patent is extended or adjusted under 35 U.S.C. 154(b) by 263 days.

(21) Appl. No.: 17/883,575

(22) Filed: Aug. 8, 2022

(65) Prior Publication Data

US 2023/0077107 A1  Mar. 9, 2023

Related U.S. Application Data

(60) Provisional application No. 63/239,326, filed on Aug. 31, 2021.

(51) Int. Cl.
*H04L 9/40* (2022.01)
*G06Q 10/0635* (2023.01)

(52) U.S. Cl.
CPC ..... *H04L 63/1433* (2013.01); *G06Q 10/0635* (2013.01)

(58) Field of Classification Search
CPC . H04L 63/14; H04L 63/1408; H04L 63/1433; H04L 63/20; G06Q 10/0635
See application file for complete search history.

(56) References Cited

U.S. PATENT DOCUMENTS

| | | | |
|---|---|---|---|
| 9,672,355 B2* | 6/2017 | Titonis | H04W 12/12 |
| 10,505,969 B2* | 12/2019 | Gorodissky | H04L 63/1433 |
| 11,677,790 B2* | 6/2023 | Yadav | G06Q 20/382 726/4 |
| 11,757,923 B1* | 9/2023 | Vandeventer | H04L 63/1433 |
| 11,816,223 B1* | 11/2023 | Vandeventer | G06F 21/577 |
| 11,829,486 B1* | 11/2023 | Lambotte | G06N 3/09 |
| 11,870,799 B1* | 1/2024 | Imrem | H04L 63/102 |
| 11,893,121 B1* | 2/2024 | Imrem | G06F 21/577 |
| 11,921,820 B2* | 3/2024 | Khanna | G06N 5/01 |

* cited by examiner

*Primary Examiner* — Hosuk Song

(57) ABSTRACT

A method for assessing vulnerability to predatory internet attacks determined using new technologies in the evaluation of personal psychological assessments so as to pinpoint vulnerable persons. Once pinpointed, those with high user risk may not be hired, or if employed already, may be provided additional information/training or have computer software protection installed at their station. Persons are administered a battery of personality/psychological evaluation questions with various statistical and data mining techniques used for common psychological assessments applied to their responses. This algorithmic model uses multiple psychological assessments for a combined measure of user risk. It has been able to show a 100 percent accuracy in the determination of an individual's user risk by using the scores of a Locus of Control test (scored between one and 100) in conjunction with the scores of the following tested four personality dimensions selected from the 30 dimensions under the five personality traits of the Big Five: Depression; Self-Consciousness; Cooperation; and Self-Discipline.

10 Claims, 3 Drawing Sheets

FIG. 3

Administer and score a personality trait test with the four personality dimensions of Depression, Self-Consciousness, Cooperation and Self-Discipline, to an individual.

Administer and score a Locus of Control personality test to the individual.

Input the individual's personality trait scores and locus of control scores into the 6 cluster user risk algorithmic model.

Use a K-Means Clustering Analysis on the individual's 5 test scores to see which risk cluster that individual fits into based on the proximity of their personality trait test scores to the cluster's centroid. This represents their user risk.

METHOD FOR ASSESSING INDIVIDUAL VULNERABILITY TO PREDATORY INTERNET ATTACKS

CROSS-REFERENCE TO RELATED APPLICATIONS

This application claims the benefit of U.S. Provisional Patent Application No. 63/239,326, filed Aug. 31, 2021, which is incorporated by reference herein in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to cybersecurity, and more particularly to the technology for determining the vulnerability, or user risk, of an individual to succumb to internet predators seeking personal information, data or money, or otherwise create harm to their organization.

BACKGROUND

The amount of business conducted on the internet is staggering. People deal with their insurance companies, health providers, doctors, lawyers, social security, places of employment, the IRS. etc., beside just purchasing items online. Essentially, internet commerce is a reality of mainstream life in the USA, and whether one wishes to participate or not is a disappearing option. Many companies only interact with their clients in this way. It is faster, easier and leaves a document history that the user can store and retrieve simply for future dealings or for verification of the details of the transaction. However, along with the advantages internet commerce their also looms the biggest deterrent—internet predators such as scammers and thieves.

Most of the scams on the internet can be avoided, yet still countless individuals fall prey to these internet predators daily, losing billions of dollars annually (which may not be recoverable), as well as personal information and company proprietary data. The information the scammers glean can be used to establish bogus identifications, purchase goods, withdraw funds, establish credit, etc. When the data that is gleaned comes from a company doing business on the internet, it may reveal proprietary information, such as customer/supplier lists, algorithms, sales data, scientific findings, secret formulas etc. It is not just the elderly and feeble of mind that are duped, as all people have a level of vulnerability.

In the past two years, almost half (47%) of U.S. consumers experienced identity theft; well over one-third (37%) experienced application fraud (i.e., the unauthorized use of one's identity to apply for an account), and over one-third (38%) of consumers experienced account takeover (i.e., unauthorized access to a consumer's existing account). There is an estimated 42% increase in identity-related losses from 2019 to 2020. Identity theft is rapidly growing in severity and will continue to flourish until new security measures such as authentication and validation methods are instituted. The majority of these internet scammers enter the user's computer system from people opening their emails, text messages or links.

When it comes to corporations conducting much of their business via the internet, they generally utilize a plethora of safeguards such as multiple firewalls, however, they remain at risk because their weak link is the employee with a high vulnerability towards opening a scammer's email or link under false pretenses. Once into a computer system, scammers may be able to access all of the private personal data stored in client databases. User problems have most recently been attributed as creating 85% of the related corporate losses. In response, organizations implement awareness programs that treat all users equally. This is not practical and it clearly doesn't work.

Henceforth, a method of determining the risk or propensity that any particular individual possesses for falling prey to an internet predator, would fulfill a long felt need in the cybersecurity industry. This new methodology utilizes and combines new technologies in the evaluation of personal psychological assessments to pinpoint vulnerable persons. Once pinpointed, those with high user risk may not be hired, or if employed already, may be provided additional information/training or have computer software protection installed.

BRIEF SUMMARY

In accordance with various embodiments, a method for determining the vulnerability or "user risk" of a particular individual to internet scamming by internet predators is provided.

In one aspect, a method of evaluating the responses an individual submitted to a battery of personality/psychological evaluation questions, so as to determine their risk factor for succumbing to the scam of an internet predator.

In another aspect, a method for the accurate determination of the actual user risk of falling prey to internet scamming, by applying various statistical and data mining techniques to common psychological assessments.

Various modifications and additions can be made to the methods discussed herein without departing from the scope of the invention. For example, while the method described above refers to particular features, the scope of this invention also includes methods having different combinations of features that do not include all of the described features herein.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 3 is a flow chart showing the method of determining the user risk of an individual responding to an internet phishing scam based on the psychological test results evaluating five dimensions of their personality.

DETAILED DESCRIPTION

Figure 1:
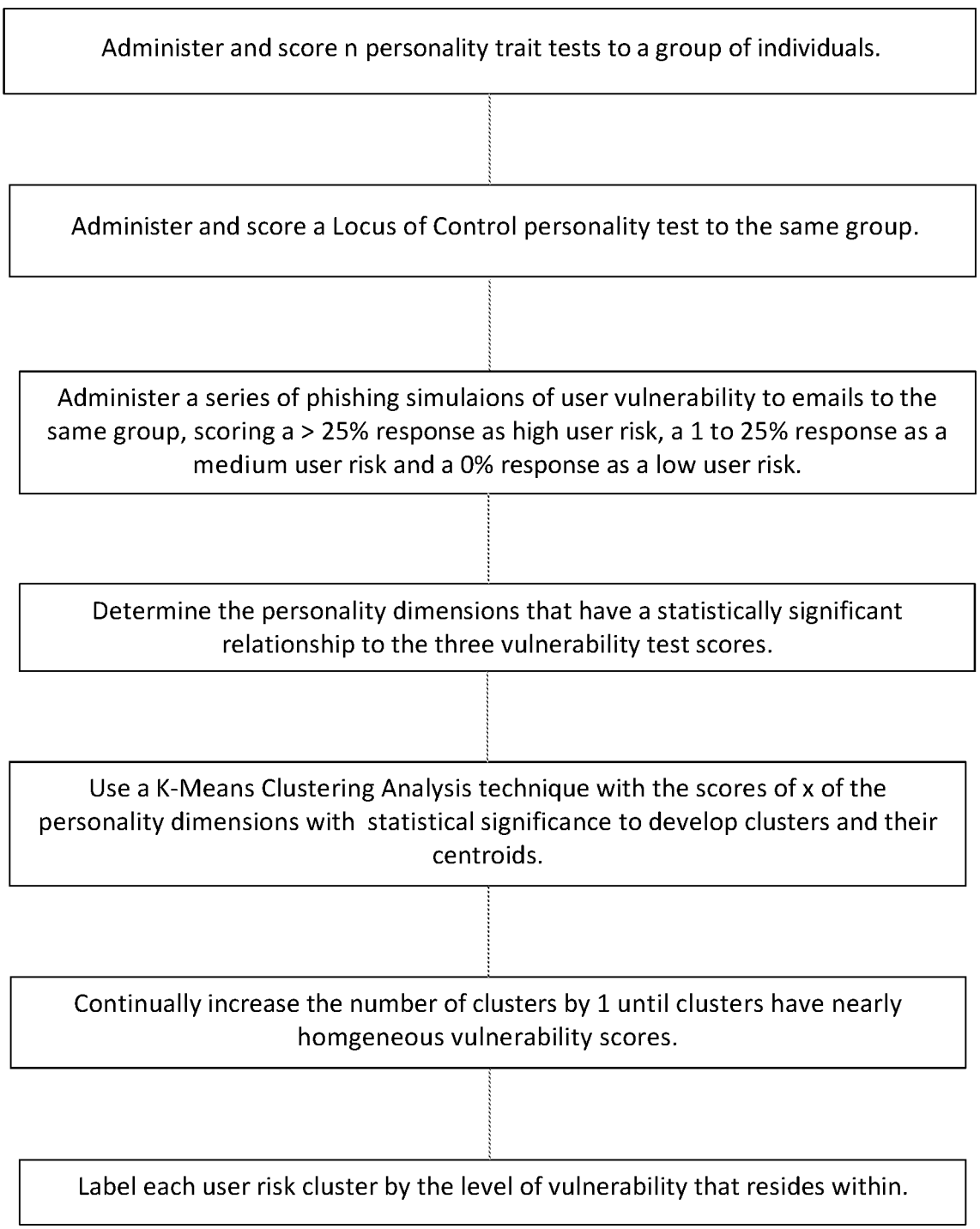
FIG. 1 is a flow chart showing the methodology for developing a test for an individual's user risk.

While various aspects and features of certain embodiments have been summarized above, the following detailed description illustrates a few exemplary methodology embodiments in further detail to enable one skilled in the art to practice such embodiments. The described examples are provided for illustrative purposes and are not intended to limit the scope of the invention.

In the following detailed description, numerous specific details are set forth to enable a thorough understanding of the inventive concept. It should be understood, however, that persons having ordinary skill in the art may practice the inventive concept methods without all these specific details. In other instances, well-known methods, procedures, tests and testing protocols/evaluation have not been described in detail so as not to unnecessarily obscure aspects of the embodiments.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, and operations, but do not preclude the presence or addition of one or more other features, integers, steps, operations, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one method may be incorporated with other methods as well. By the same token, however, no single feature or features of any described method should be considered essential to every embodiment of the methodology, as other embodiments of the methodology may omit such features.

As used herein, the term "user risk" refers to the level of vulnerability a computer user exhibits towards clicking or opening a medium sophistication phishing message (link). These user risks are categorized as high, medium or low, based on the number of times (or percentage) the user succumbs to opening a phishing message from a set of different, medium sophistication phishing messages. Here the sophistication of the phishing message was set at a medium level, although other levels of sophistication and different numbers of times (or percentages) the user succumbs to opening a phishing message may be used. The percentage may be established from the results of a single set of phishing messages or from a plethora of different sets of such phishing messages administered to the same individual. This user risk need not be related to computer messages and based on opening of phishing links, but rather can be used to rate vulnerability of individuals to other actions.

As used herein, the terms "phishing link" and "scam" refer to a message, email or URL link that provides a direct connection to allow a scammer access to the user's computer or which prompts the user to divulge data (personal or otherwise) under false pretexts.

As used herein, the term "medium sophistication scam" means a phishing inquiry (email or text) that invites a responsive interaction from a computer user via a message that has a context to a group that the user is in but does not include any context personal to the user. For evaluation purposes herein, the users were tested on four such phishing inquiries, although this number may be increased and the level of sophistication changed for other tests. Here, a high user risk corresponds to a user that provides a response to a phishing message greater than 25% of the time. A medium user risk corresponds to a user that provides a response to a phishing message between 1% and 25% of the time. A low user risk corresponds to a user that does not provide any response.

As used herein, the term "Big Five" refers to five aggregate-level personality trait descriptors summarized as follows: Neuroticism; Extroversion; Agreeableness; Conscientiousness; and Openness to Experience scored on the IFIP NEO 60 test or any other equivalent test.

As used herein, the term "statistically significant relationship" refers to using an analysis of variants statistical technique (ANOVA with a statistically significance of a 0.95 confidence interval).

As used herein, the term "cluster analysis" refers to a set of data reduction techniques. Clustering is one of the most common exploratory data analysis techniques used to get an intuition about the structure of the data. It can be defined as the task of identifying subgroups in the data such that data points in the same subgroup (cluster) are very similar while data points in different clusters are very different. In other words, clustering seeks homogeneous subgroups within the data such that data points in each cluster are as similar as possible according to a similarity measure such as Euclidean-based distance or correlation-based distance. The decision of which similarity measure to use is application-specific. Compared to other data reduction techniques like factor analysis (FA) and principal components analysis (PCA), which aim to group by similarities across variables (columns) of a dataset, cluster analysis aims to group observations by similarities across rows. K-Means Clustering was used because it is considered as one of the most used clustering algorithms due to its simplicity.

The present invention relates to the novel application of data science techniques (such as data mining) to psychological personality trait assessments, so as to develop a testing and evaluation methodology that will determine the user risk of an individual as high, medium or low, with 100 percent accuracy. These user risks are of extreme interest in the cyber security awareness field as they indicate which individuals in a business, organization, or other workplace should need additional safeguards and/or training to reduce their user risk. This is the first time a set of algorithmic determinations of user risk has been developed from K-means clustering (data mining) of psychological testing results (scores) based on the five personality dimensions of Locus of Control, Depression, Self-Consciousness, Cooperation and Self-Discipline.

The use of psychological assessments to determine user risk has been done. However, previous models looked at the five different traits scored by various forms of The Big Five Psychological Assessment (Big Five) and evaluated the predictability of individual user risk based on their scores on each or any combination of the following five personality traits: Neuroticism; Extroversion; Agreeableness; Conscientiousness and Openness to Experience. To date, none of the prior art surveyed has combined the analysis of different psychological measures other than the individual analysis of the Big Five's personality traits, to determine how they might combine to accurately determine user risk. None of the prior art surveyed has attempted to break down the five personality traits into their 30 comprising dimensions to determine potential user risk. Personality dimension test scores, alone and in combination with locus of control test scores, have not been evaluated in various combinations for any statistical significance to user risk with data mining techniques such as K-Means Cluster Analysis.

In the way of explanation, the IFIP NEO 60 test (International Personality Item Pool of the NEO-PI-R) poses 60 questions of the five personality traits. Each personality trait has six personality sub-traits (termed dimensions). There are two questions posed of each of the thirty dimensions. The two answer sets are scored and averaged to establish a dimension score value between one and five.

The six dimension values that make up each personality trait are also summed and averaged to arrive at the five personality trait numbers. The correlation between these five personality trait numbers and propensity of a user to open a scam have been used to intuitively guess a likelihood of risk the user poses. This has met with marginal success but only with vague associations using the Neuroticism trait, however, the results vary greatly at best, as there has been no statistical significance found between the Big Five's characteristic trait scores and user risk. There have been similar poor results analyzing the psychological assessment scores from Locus of Control testing when investigating victimization on the Internet. All previous results were at best, indicative, but not dispositive of user risk.

While the attributes previously defined can be used to determine user risk, given the fact that user risk is not dependent upon a single personality trait, but multiple personality traits with multiple combinations producing the same risk level, user risk cannot accurately be calculated through traditional psychological data analysis techniques. Here, cluster analysis using the K-Means Clustering Algorithm was pioneered with the psychological test results and user risk results to develop accurate estimates of user risk. This technique has never been previously attempted in the searched literature.

The present algorithmic model, in contrast, uses multiple psychological assessments for a combined measure of user risk. It has been able to show a 100 percent accuracy in the determination of an individual's user risk by using the scores of a Locus of Control test (scored between one and 100) in conjunction with the scores of the following tested four personality dimensions selected from the 30 dimensions under the five personality traits of the Big Five: Depression; Self-Consciousness; Cooperation; and Self-Discipline. These four dimensions were selected from the 30 dimensions by looking for statistically significant relationships between their scores and the number of times (or percentage) the user succumbs to opening a specified number of a set of different, medium sophistication scams (phishing links). Once the test scores of these four dimensions and Locus of Control were compiled from representative computer users, data mining techniques including K-Means Clustering Analysis were applied to evaluate their combined relationship to user risk.

The Locus of Control test used may vary but in the preferred embodiment the test selected from LocusOfControl.net, which scores 20 questions on a one to five scale.

Once it was established that the scores of the four personality dimensions (also called sub-traits) of Depression, Self-Consciousness, Cooperation and Self-Discipline, as well as Locus of Control had individual statistically significant relationships to the user risk test results, a K-Means Clustering Analysis was applied to the combination of these five personality test scores. This data was gradually analyzed into different numbers of clusters beginning at two and increasing by one until there was a 100 percent correlation established between the clusters and either a high, medium, or low user risk. That is to say that each of the three user risk levels of the entire control group fell into one of the risk clusters established. The number of risk clusters required to capture this 100 percent relationship with the three levels of user risk was experimentally determined to be six. (See FIG. 1) Each risk cluster has an associated algorithmically determined centroid.

As shown in the table below, the mathematical boundaries of the five personality dimensions in each risk cluster is mathematically presented, along with the user risk that each individual with personality dimension test scores falling onto that risk cluster had. The centroids of each cluster were determined but not included in the table.

With this six risk cluster model established, an algorithm was developed that analyzes the input of an individual's test scores on the four personality sub-traits (dimensions) in relation to the proximity to the centroid of each of the six risk clusters, and determines which risk cluster that individual fits into or is closed to. Their user risk level is thus the user risk assigned to that risk cluster. (See FIG. 3)

Figure 2:
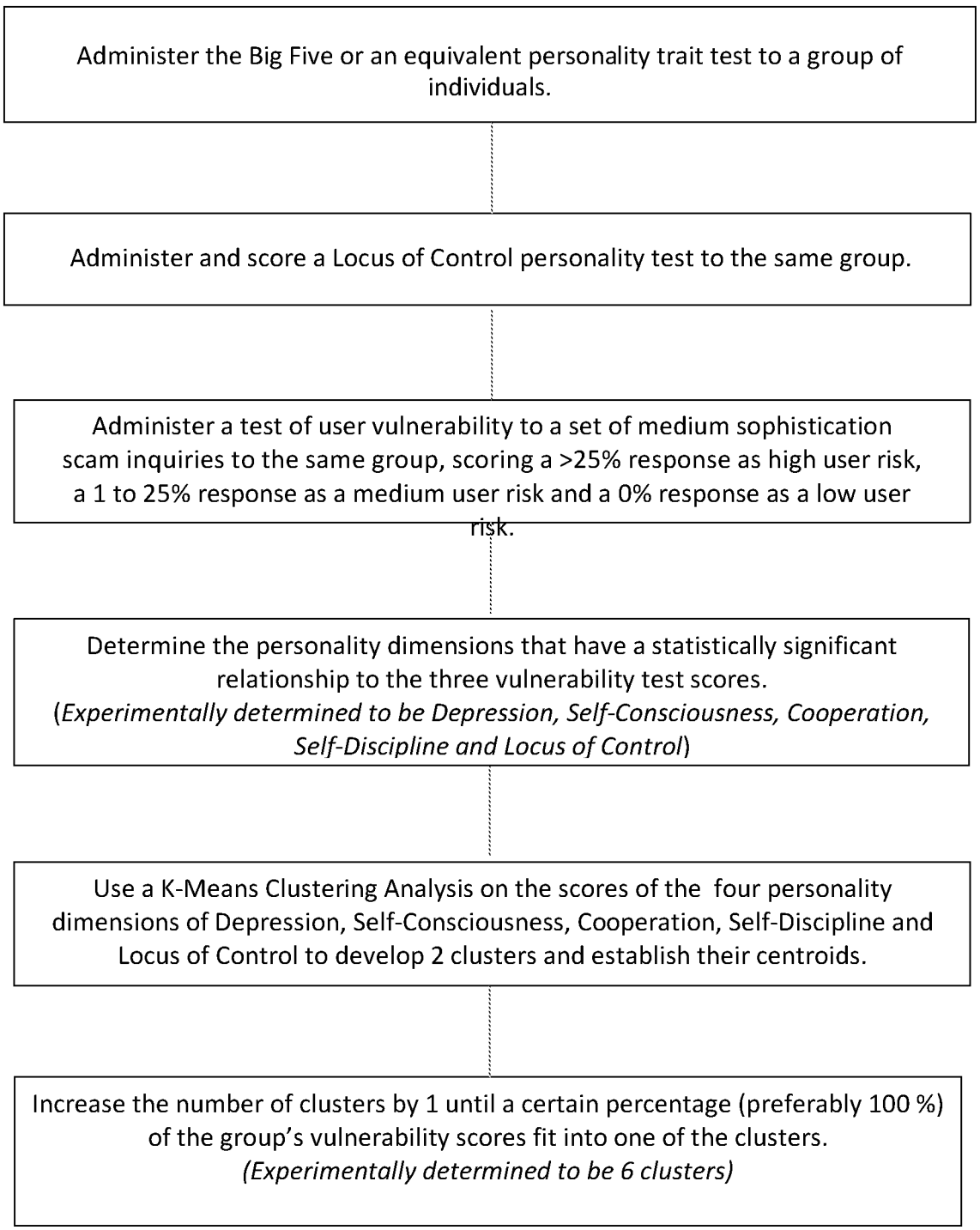
FIG. 2 is a flow chart showing the results obtained from psychological testing and how they are used in developing the six clusters used in determining the individual user risk test.

Looking at FIG. 2 it can be seen that to arrive at the five different dimensions used in the chart, numerous different psychological trait tests were administered to a control group comprising some 67 different personality characteristics (traits or dimensions). Using an analysis of variants statistical technique (ANOVA with a statistically significance of a 0.95 confidence interval), only dimensions of the Big Five and the locus of control test scores showed any statistically significant correlation between the scores of these traits or dimensions and user risk. Once shown to be statistically significant, then a K-Means Clustering Analysis was performed creating increasingly higher numbers of risk clusters, until 100% of all of the personality trait test scores falling into in any of the clusters, all had the exact same user risk scores (of high, medium or low user vulnerability).

As can be seen in the table herein, of the six risk clusters, three are high risk, two are medium risk and one is low risk. Thus, with all of the personality dimension test scores in each algorithmically defined and mathematically described specific cluster related (or aligned) with only one of the three classifications of user risk, there is a method to predict the user risk of an individual based on the scores of personality dimension tests administered to them. The accuracy of this prediction should be 100 percent when the individual's personality test scores fall within a cluster.

The individual's personality dimension test scores will be used to determine the "closest" of the six user risk cluster centroids. The user risk of that nearest cluster is then assigned to that individual. Experimentation will further refine the algorithm's user risk predictability for individuals with personality dimension.

Clusters are groupings of the test scores of unique personality dimensions that indicate different levels of predictability of the user's vulnerability to predatory internet schemes (phishing inquiries). The mathematical representations of the six clusters along with the single user risk shown to exist in that specific cluster, are shown in the following table:

TABLE 1

RISK CLUSTERS AND ASSOCIATED RISK

| Trait | Depression | Cluster 1 Self_Consciousness | High Risk Cooperation | Self_Discipline | Locus_Of_Control |
|---|---|---|---|---|---|
| Mean | 3.128571429 | 2.9 | 3.685714286 | 3.228571429 | 68.88571429 |
| SD | 0.80752761 | 0.765045174 | 0.932152114 | 0.610482658 | 8.713651995 |
|  | Depression | Cluster 2 Self_Consciousness | High Risk Cooperation | Self_Discipline | Locus_Of_Control |
| Mean | 1.227272727 | 2 | 4.818181818 | 4.136363636 | 70.54545455 |
| SD | 0.467099366 | 1.183215957 | 0.337099931 | 0.595437196 | 22.5980691 |
|  | Depression | Cluster 3 Self_Consciousness | Medium Risk Cooperation | Self_Discipline | Locus_Of_Control |
| Mean | 2 | 1.894736842 | 4.315789474 | 4.210526316 | 78.94736842 |
| SD | 0.912870929 | 0.774219093 | 0.749268649 | 0.608180106 | 4.648460727 |
|  | Depression | Cluster 4 Self_Consciousness | High Risk Cooperation | Self_Discipline | Locus_Of_Control |
| Mean | 4.35 | 4.5 | 3.85 | 2.25 | 49.1 |
| SD | 0.625832779 | 0.577350269 | 0.747217059 | 0.950146188 | 9.194805297 |
|  | Depression | Cluster 5 Self_Consciousness | Medium Risk Cooperation | Self_Discipline | Locus_Of_Control |
| Mean | 3.541666667 | 3.541666667 | 3.333333333 | 3.166666667 | 65.41666667 |
| SD | 0.655686085 | 0.721687836 | 0.912870929 | 0.577350269 | 10.29084618 |
|  | Depression | Cluster 6 Self_Consciousness | Low Risk Cooperation | Self_Discipline | Locus_Of_Control |
| Mean | 2.25 | 2.192307692 | 3.519230769 | 3.346153846 | 73.53846154 |
| SD | 1.17686023 | 0.938902797 | 1.024507386 | 0.797110165 | 10.56496387 |

As shown herein, a balance of different personality dimensions must be used to assess user vulnerability, rather than a single personality trait. Experimentation has proven that six risk clusters of psychological testing scores derived from five different personality dimensions derived from Locus of Control and Big Five assessments, including Locus of Control, Depression, Self-Consciousness, Cooperation, and Self-Discipline, create a framework for determining a 100 percent accurate prediction of whether that individual poses a high, medium or low user risk. A K-Means Clustering Program is used to calculate which risk cluster's centroid is closest to that individual's personality testing scores. This will determine which risk cluster that individual belongs to, and their associated user risk.

Generally, the present disclosure relates, in general, to user risk and cybersecurity, and more particularly to determining actual user risk through the use of common psychological assessments to which various statistical and data mining techniques such as K-Means Clustering, has been applied to develop statistically significant correlations with user risk so as to accurately predict individual user risk with a 100% correct classification of user risk.

While certain features and aspects have been described with respect to exemplary embodiments, one skilled in the art will recognize that numerous modifications are possible. This methodology and the results thereof are based on the assigned definitions of the sophistication level of the testing scam, the number of vulnerability tests conducted, the testing population demographics and size, and the vulnerability responses assigned the levels of the user risk. Also, the actual type of personality and locus of control tests administered may alter the results. Moreover, while the procedures of the methods and processes for determining individual user risk described herein are described in a particular order for ease of description, unless the context dictates otherwise, various procedures may be reordered, added, and/or omitted in accordance with various embodiments. The methodology herein may also be applied to all types of user risk. Moreover, the procedures described with respect to one method or process may be incorporated within other described methods or processes. Consequently, it will be appreciated that the invention is intended to cover all modifications and equivalents within the scope of the following claims.

Having thus described the invention, what is claimed as new and desired to be secured by Letters Patent is as follows:

1. A method for assessing individual vulnerability to predatory internet attacks, comprising the steps of:
   administering and scoring a personality trait test that evaluates a personality dimension set of depression, self-consciousness, cooperation and self-discipline to a control group of individuals;
   administering and scoring a locus of control personality test to said control group;
   administering a test of the number of times said individuals in said control group succumb to opening a specified number of a set of different internet phishing scam links;
   classifying said number of times as a high, medium or low user risk for vulnerability to predatory internet attacks;
   applying a K-Means Clustering Analysis to said personality trait test scores and said personality test score to develop a data that is analyzed into different numbers of clusters with centroids until there is a 100 percent correlation established between said clusters and said high, medium, or low user risk;

administering and scoring a personality trait test that evaluates a personality dimension set of depression, self-consciousness, cooperation and self-discipline of a selected individual;

administering and scoring a locus of control personality test to said selected individual;

calculating said selected individual's risk level for succumbing to an internet phishing scam by subjecting said selected individual's test scores from said personality trait tests and an individual's test scores from said locus of control personality test by applying an algorithmic determination of their relation to the proximity of a centroid of a high, medium or low risk cluster of user risk values established by said control group;

assigning a user risk level to said selected individual as high, medium or low, based on the proximity of their test scores to said high, medium or low risk cluster centroid.

2. The method for assessing individual vulnerability to predatory internet attacks of claim 1 wherein said K-means clustering analysis performed on said control group individual's measurements on dimensions of said personality trait test scores and said control group individual's locus of control personality test scores data was analyzed into different numbers of clusters with centroids, beginning at two clusters and increasing by one until a significant correlation was established between said clusters and either of a high user risk, medium user risk, or low user risk.

3. The method for assessing individual vulnerability to predatory internet attacks of claim 2, wherein there are six said user risk clusters.

4. The method for assessing individual vulnerability to predatory internet attacks of claim 3 wherein said K-means clustering analysis analyzes the input of an individual's test scores on four personality dimensions and their Locus of Control score in relation to the proximity to said centroid of each of the six risk clusters, and determines which risk cluster that selected individual fits into, thus the user risk assigned to that risk cluster.

5. The method for assessing individual vulnerability to predatory internet attacks of claim 4 wherein said high user risk corresponds to a scoring of above 25% of user responses, said medium user risk corresponds to a scoring of greater than 0% and up to 25% of user responses, and a low user risk corresponds to a scoring of 0% of user responses.

6. The method for assessing individual vulnerability to predatory internet attacks of claim 1 wherein said personality trait test that evaluates the personality dimensions of depression, self-consciousness, cooperation and self-discipline of said control group or said selected individual is the Big Five personality trait test.

7. The method for assessing individual vulnerability to predatory internet attacks of claim 6 wherein said K-means clustering analysis performed on said individual's measurements on dimensions of said personality trait test scores and said individual's locus of control personality test scores data was analyzed into different numbers of clusters with centroids, beginning at two clusters and increasing by one until a significant correlation was established between said clusters and either of a high user risk, medium user risk, or low user risk.

8. The method for assessing individual vulnerability to predatory internet attacks of claim 7 wherein said K-means clustering analysis analyzes the input of an individual's test scores on four personality dimensions and their Locus of Control score in relation to the proximity to said centroid of each of the six risk clusters, and determines which risk cluster that selected individual fits into, thus the user risk assigned to that risk cluster.

9. The method for assessing individual vulnerability to predatory internet attacks of claim 8 wherein levels of said user risk are categorized as high risk, medium risk or low risk, based on the percentage the user responses to opening a specified number of a set of different, phishing links or scams.

10. The method for assessing individual vulnerability to predatory internet attacks of claim 9 wherein said high user risk corresponds to a scoring of above 25% of user responses, said medium user risk corresponds to a scoring of greater than 0% and up to 25% of user responses, and a low user risk corresponds to a scoring of 0% of user responses.

* * * * *